(12) United States Patent
Keesmaat

(10) Patent No.: US 6,229,875 B1
(45) Date of Patent: May 8, 2001

(54) APPARATUS AND METHOD FOR PROVIDING AN OPTIMUM BRIGHTNESS CONTROL SIGNAL FOR LUNG TISSUE X-RAY IMAGES

(75) Inventor: Tijmen Keesmaat, Amstelveen (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/376,859

(22) Filed: Aug. 19, 1999

(30) Foreign Application Priority Data

Aug. 18, 1998 (EP) .................................................. 98202772

(51) Int. Cl.$^7$ ...................................................... H05G 1/64
(52) U.S. Cl. ......................... 378/98.7; 378/119; 348/126; 345/211
(58) Field of Search ................................... 378/98.7, 119; 348/126, 87; 345/211

(56) References Cited

U.S. PATENT DOCUMENTS

| 4,236,178 | * | 11/1980 | Tiemeijer | ................................ 358/93 |
|---|---|---|---|---|
| 5,461,658 | * | 10/1995 | Joosten | ................................ 378/98.7 |
| 5,608,453 | * | 3/1997 | Gerber et al. | ........................... 348/87 |
| 5,764,225 | * | 6/1998 | Koshobu | ................................ 345/211 |

FOREIGN PATENT DOCUMENTS

| 0629105 | 12/1994 | (EP) | ................................ H05G/1/36 |
|---|---|---|---|
| 0748148 | 12/1996 | (EP) | ................................ H05G/1/36 |
| 0779770 | 6/1997 | (EP) | ................................ H05G/1/36 |

* cited by examiner

Primary Examiner—Robert H. Kim
Assistant Examiner—Pamela R. Hobden
(74) Attorney, Agent, or Firm—John F. Vodopia

(57) ABSTRACT

An X-ray examination apparatus is provided including: an X-ray image means for providing an X-ray image composed of pixels each having a grey value, and a brightness control system which is coupled to the X-ray image means in order to apply a brightness control signal of the image to the X-ray image means. The brightness control system comprises an X-ray image analyzing means for deriving the brightness control signal from a maximum in the number of times that a grey value occurs in the X-ray image. The apparatus provides optimized brightness in the visual image such that a physician is capable of properly examining changes in weakly absorbing tissues or body parts, such as lungs or the like, thus enabling optimized visual analysis.

18 Claims, 2 Drawing Sheets

APPARATUS AND METHOD FOR PROVIDING AN OPTIMUM BRIGHTNESS CONTROL SIGNAL FOR LUNG TISSUE X-RAY IMAGES

BACKGROUND OF THE INVENTION

1. Field of the Invention

The present invention relates to an X-ray examination apparatus which includes: an X-ray image means for providing an X-ray image composed of pixels, each having a grey value, and a brightness control system which is coupled to the X-ray image means in order to provide the X-ray image means with a brightness control signal of the X-ray image. The present invention also relates to a method for deriving a brightness control value from information contained in an X-ray image.

2. Description of Related Art

Such an apparatus and method are known from EP-A-0 629 105. This document discloses in particular an X-ray examination apparatus having an X-ray image means including an X-ray source, an X-ray image intensifier, a lens structure and a visible image processing device. An auxiliary light detection system of the apparatus forms a brightness control system and provides a brightness control signal which is fed back to the X-ray image means for X-ray image brightness control. In particular brightness and contrast of the X-ray image are being controlled by allowing only certain parts of the visible image to contribute to the brightness control. These parts are called measuring fields, which measuring fields are either selected manually, which is troublesome, or automatically. The prior art application discloses processor controlled automatic selection based on the brightness or grey values of parts in the visible image. The automatic selection raises additional problems in a situation wherein the image shows virtually unabsorbed, so called direct radiation and the object to be examined contains tissues having a low X-ray absorbing, for example lungs, such as in thorax (spine/lungs) images. Discrimination in such an image between parts of the body that may and parts that may not contribute to the brightness control in the X-ray examination apparatus is problematic, also because the position of the lungs in the image may vary.

SUMMARY OF THE INVENTION

Therefore, it is an object of the present invention to provide an apparatus and method providing an improved X-ray image quality and being capable of offering a physician additional possibilities for notably visual X-ray analyses of certain changes that appear in less absorbing body parts, such as in particular the lungs, without being bothered by negative influences of possible direct radiation in the image or other objects more absorbing than the lungs.

To this end, the apparatus according to the present invention is characterized in that the brightness control system comprises an image analyzing means for deriving the brightness control signal CS from a maximum over the number of times f(gr) that a grey value gr occurs in the image.

It has been found that the brightness control signal thus derived provides an advantageous, adequate indicator for discriminating between relevant sorts of information contained in the X-ray image when the aim is to derive brightness control information therefrom. Using either directly or indirectly the maximum of the number of times that a grey value occurs in the relevant visible image, the weak X-ray absorbing objects in the image can be given an optimum brightness despite their varying position in the image; this improves the image quality and makes these weak X-ray absorbing objects better discernable for medical examination purposes.

Moreover, said indicator indicates the transitional brightness area between the weak absorbing tissue of, for example, the lungs and said direct radiation. It is a further advantage of the apparatus according to the present invention that it is no longer necessary to manually specify a region of interest in the image since, given a tissue to be imaged, the apparatus provides optimized, automated brightness control information. Advantageously, the optimized brightness control signal can still be fine tuned in dependence on further particulars of the image or technical components or elements in the apparatus.

Accordingly, the method having easy and fast software implementation is characterized in that information wherefrom a brightness control value is derived includes data about a maximum in the frequency f(gr) of grey values gr occurring in the image.

One embodiment of the apparatus according to the invention, wherein the image analyzing means incorporate time averaging means for deriving the brightness control signal from a maximum over the time-averaged number of times that a grey value gr occurs in the X-ray image, provides the advantage that, despite a weak signal to noise ratio as well as jitter conditions in the available image signal, a stable brightness control signal can still be output.

With or without time averaging, in a further embodiment of the apparatus according to the invention the image analyzing means incorporate running averaging means for deriving the brightness control signal from a maximum over the running averaged number of times f(gr) that n possibly, but not necessarily, consecutive, either in time or in grey value, grey values gr occur in the image. This implementation also provides increased stability, because the noise is averaged by applying the running average operation across n generally digital grey values, wherein n is generally lower than about 15; in a practical, sufficiently reliable software implementation n equals 5.

In still a further embodiment of the apparatus according to the invention the image analyzing means comprises threshold means for deriving the brightness control signal from a percentage p of the maximum in the number of times a grey value occurs in the image. Advantageously the threshold means are arranged to allow the percentage p to be adjustable, preferably programmably adjustable, the percentage p being between 30% and 98%, preferably between 60% and 95%, and more preferably about 90% lower than said maximum number of times a grey value occurs in the image; the latter percentage has proven to be optimally suited for effective visualization of certain lung tissues.

The present invention mainly provides flexibility by being capable of empirically determining p and/or n in dependence on inter alia image parameters, such as image amplifier format or type, maximum number of available grey values, amount of or estimation of direct radiation present in the image, X-ray intensity (X-ray tube current), film type, X-ray frequency spectrum (X-ray tube high voltage) and/or object parameters such as expected absorption coefficients of imaged objects such as, for example lungs, brain etcetera. Preferably, well known Fuzzy Logic is used in order to provide a software implemented image brightness control based on Fuzzy Logic rules.

BRIEF DESCRIPTION OF THE DRAWING

The apparatus and method according to the invention will now be elucidated further, together with their additional advantages, while making reference to the appended drawing wherein similar components are denoted by the same reference numerals. In the drawing.

DETAILED DESCRIPTION OF THE PREFERRED EMBODIMENT

Figure 1:
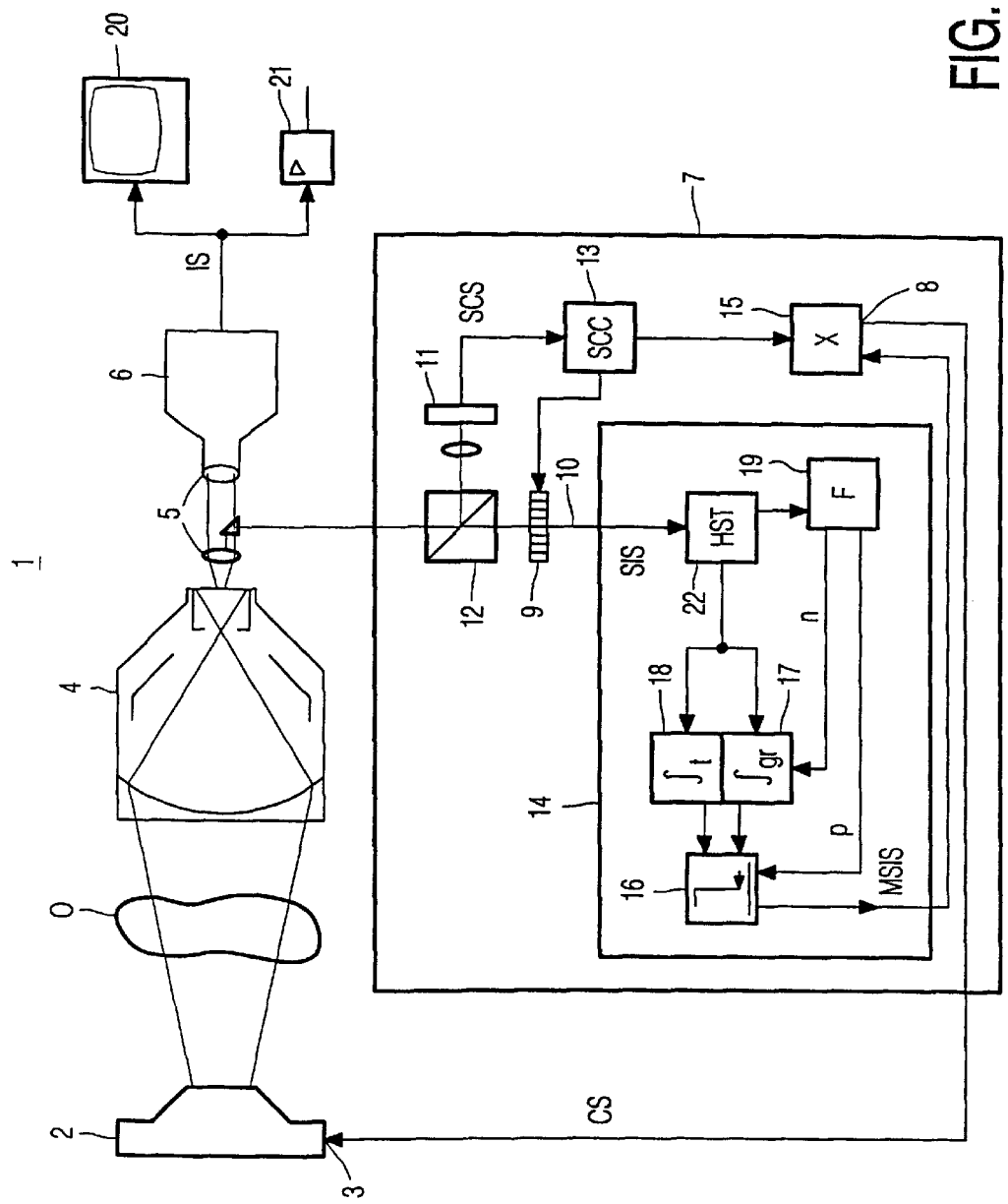
FIG. 1 shows schematically an embodiment of the apparatus according to the invention.

FIG. 1 shows schematically an X-ray apparatus 1, including an X-ray source 2 having a brightness control input 3 for influencing the intensity of X-rays emanating from the source 2. The X-rays irradiate an object O and form an X-ray image thereof on an image convertor/intensifier 4 of the apparatus 1. The apparatus 1 also includes a lens structure 5 interposed between the image intensifier 4 and a video means 6, for example provided, with a video camera or video recording means (not shown). The means denoted by the reference numerals 2–6 thus form X-ray image means for providing the X-ray image of the object to be examined, which may be a human being or generally a part thereof. The video means 6 outputs an image signal (IS), e.g. an electronic video signal which represents the image information in the X-ray image. The image signal is applied to a monitor 20 so as to display the image information. The image signal IS is also applied to a buffer unit 21. The image signal is stored in the buffer unit 21 while awaiting the printing of the image information on a hard-copy or the further processing of the image signal.

The optical image present in the lens structure 5 is used to derive therefrom using a brightness control system 7, a brightness control signal CS on control output 8 which in its turn is coupled to the control input 3. Proper adjustment of the brightness of the acquired image is vital to a physician so as to allow high quality visual inspection of the part to be examined with the aid of the video means 6. A brightness control system may be embodied as described in EP-A-0 629 105 which is considered to be incorporated herein by way of reference. The brightness control system 7 schematically shown in FIG. 1 includes a CCD detector 9 which has a detector output 10 for providing spatial information about the visual image and a photosensor 11 which is coupled to a beam splitter 12. The photosensor 11 applies a sensitivity control signal SCS, having a sufficient dynamic range of brightness, to a sensitivity control circuit 13 which in its turn is connected to the CCD detector 9. Finally, a spatial information signal SIS, having the required dynamic range of brightness, is fed from the detector 9 to an image analyzing means 14 in order to allow digital manipulation of pixels of the visual image. The image analyzing means 14 outputs, in a way yet to be described, a mean value spatial information signal MSIS to a multiplier 15 for multiplication by the sensitivity control signal SCS, which multiplication yields the desired brightness control signal CS on the control output 8.

The extraction of the spatial information signal MSIS in the image processing unit 14 while using the brightness of relevant parts, such as lungs, contained in the visible image will now be described in detail. Convenient starting points from a point of view of clarity of description are histograms, such as the graphs exemplified in FIGS. 2–4, wherein the number of times f(gr) a grey value gr occurs in every pixel of a visual image, i.e. the grey value frequency f(gr), is graphically shown in dependence on possible pixel grey values gr. Possible grey values extend from 0 (full black) to $gr_{max}$ (full white). Such a histogram can be prepared by means of a method and device as described for instance in EP-A-0 748 148, which is considered to be included herein by way of reference. The image analyzing means 7 includes an arithmetic unit 22 which computes the histogram from the spatial information signal SIS. Information contained in the histogram is useful for automatically determining the optimum brightness control signal (CS) value. The information in the histograms which is important because it contains the pixels in the X-ray image representing low absorption tissue, such as lung tissue, is included in the first/left lobe in FIG. 2. The second/right lobe represents lighter (brighter) pixels. The second lobe is identified as direct or virtually unabsorbed X-ray radiation.

Figure 2:
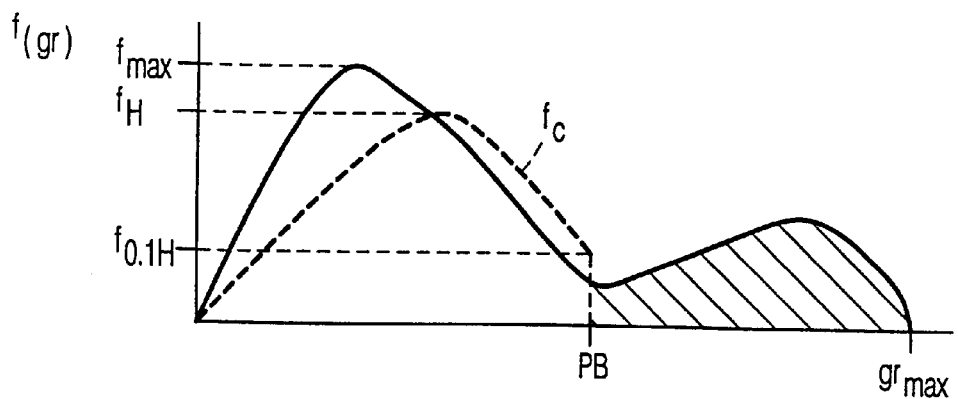
FIG. 2 shows an exemplary histogram of an image containing lung tissue, where direct radiation is present in the image and an optimum brightness control signal is determined by means of the apparatus of FIG. 1.
Figure 3:
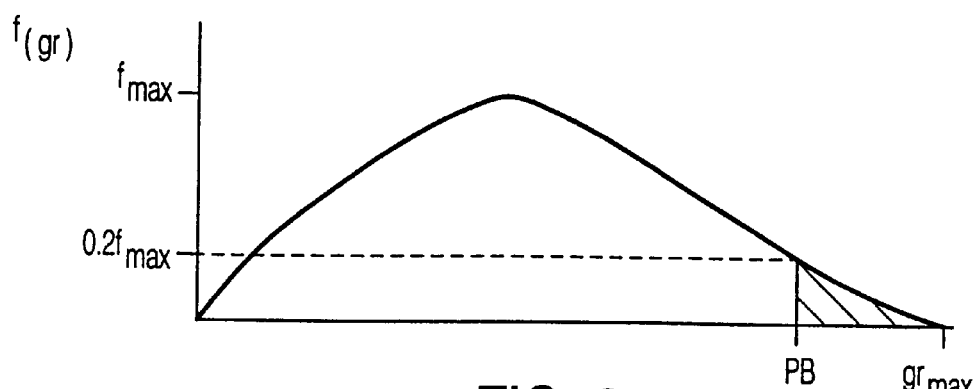
FIG. 3 shows another histogram with virtually no direct radiation.
Figure 4:
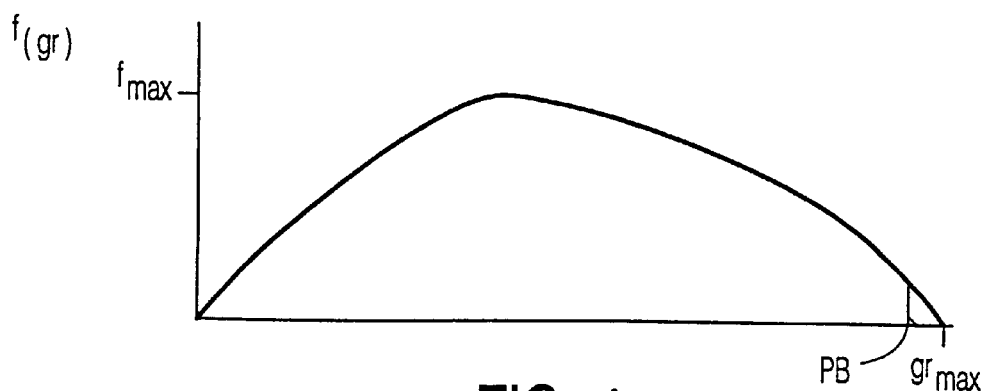
FIG. 4 shows still another histogram without direct radiation.

The graphs exemplified in the FIGS. 3 and 4 show no second lobes. A brightness control value can be derived from the graphs of the histograms of FIGS. 2–4 by image analyzing means 14 which is included in the apparatus 1 in order to derive the optimum brightness control signal CS from a maximum $f_{Max}$ in the number of times a grey value occurs in the image. Usually the X-ray image analyzing means 14 comprises possibly software implemented threshold means 16 for deriving the brightness control signal CS from a percentage p of the maximum in the number of times a grey value occurs in the visible image. Suppose, for example, that the maximum frequency occurring in the histogram of FIG. 3 is $f_{Max}$; if p=80% a breakpoint PB then lies at 0.2 times $f_{Max}$. PB thus indicates the 'position' of the lungs in the histogram, that is to say PB can be taken as a measure for controlling the brightness of the X-ray image by means of the control signal CS; as a result the lungs will generally be very well discernable therein.

A second embodiment will be explained while referring again to FIG. 2. Now the frequency threshold value in the threshold means 16 is based on a percentage p which equals, for example 90%. If the X-ray analyzing means incorporate running averaging means 17, the brightness control signal CS may be derived from the maximum of the running averaged numbers of times that n, for example, consecutive grey values occur in the X-ray image. In that case the running average maximum $f_H$ is at least composed of $f_{Max}$ and of frequency values around $f_{Max}$. So in the specific example where n=5 and the threshold value lies 90% below the highest average grey value frequency $f_H$, namely at $f_{0.1H}$, the running averaged or convoluted frequency graph $f_c$ shown in dotted form in FIG. 2 determines the breakpoint PB where the line $f_{0.1H}$ crosses the graph $f_c$. FIG. 4 schematically shows the case where PB is determined for p=95% and n=1, similar to the embodiment of FIG. 2. Again the result PB can be taken as a measure for controlling the brightness of the X-ray image by means of the control signal CS for optimized discernability, in particular for low-absorption tissues.

There are, however, situations where the breakpoint PB as such and as defined above does not indicate the 'position' of the lungs in the histograms accurately enough to base the brightness control thereon. Such situations arise when there is less or no direct radiation present in the histogram and hence the hatched area in FIG. 2 is small, as is shown in the FIGS. 3 and 4. It has been found that relating the above mentioned measure for controlling the brightness of the X-ray image to an additional parameter DIFF according to the formula:

$$DIFF = 1 - PB/gr_{max}$$

yields a more stable algorithm for accurate control of the brightness in cases not involving too much direct radiation in the X-ray image. In those cases the hatched area is small.

In cases with more direct radiation, such as shown in the histogram of FIG. 2, the hatched surface area alone can be taken as a measure for the amount of direct radiation; this measure can be used to correct PB for providing an accurate brightness control in those cases too.

In practice an additional correction can be achieved by correcting PB for the image format used by the image intensifier 4.

Generally speaking the X-ray analyzing means incorporate time averaging means 18 for deriving a stable and low-jitter brightness control signal from the maximum over the time averaged number of times a grey value gr occurs in the image. Thus, in practice the control signal SIS is time averaged before being applied to the threshold means 16.

It has been found in practice that many variations can be introduced such that the above n and p can be fine tuned and adjusted to the specific needs of a physician who wishes to visually analyze parts or details in weakly absorbing, mostly human objects. Empirical determination in dependence on inter alia image parameters, such as image amplifier format or type, maximum number $gr_{max}$ of available grey values gr, amount of or estimation (hatched area in FIG. 2) of direct radiation present in the histogram of the image, X-ray intensity (X-ray tube current), X-ray film type, X-ray frequency spectrum (X-ray tube high voltage) and/or object parameters, such as expected absorption coefficients of objects for example lungs, brain etc. is possible.

The method has proven to be a powerful tool for discriminating relevant information from less relevant information in an histogram of an image containing in particular, but not exclusively, weakly absorbing tissues or body parts.

Preferably, the apparatus 1 comprises Fuzzy Logic means 19 for performing accurate control of the brightness of the image according to Fuzzy Logic rules in dependence on the above-mentioned image and object parameters. The Fuzzy Logic means 19 is coupled to the arithmetic unit 22. The arithmetic unit applies the histogram to the Fuzzy Logic means 19. The Fuzzy Logic means outputs settings of the running averaging means 17 and the threshold means. In particular, the Fuzzy Logic means 19 applies suitable values of the parameters n and p to the running averaging means 17 and to the threshold means 16, respectively. The Fuzzy Logic means 19 notably is also coupled to the threshold means 16 and to the running averaging means 17. In particular the amount of direct radiation represented by the hatched area (see FIG. 2) can be used to decide in a Fuzzy Logic way whether or to what extent PB or DIFF are used as parameters for accurate brightness control for weakly absorbing tissues, such as the lungs. The variety of different functions elucidated above will be implemented in either hardware or software in a (micro)processor or suitably programmed computer. A variety of alternative embodiments and implementations are now within reach of a person skilled in the relevant art.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An X-ray examination apparatus comprising:
   an X-ray image means for providing an X-ray image of an object composed of pixels, each having a grey value (gr), and
   a brightness control system which is coupled to the X-ray image means in order to provide the X-ray image means with a brightness control signal (CS) of the X-ray image, wherein the brightness control system comprises an image analyzing means for deriving the brightness control signal (CS) from a maximum over the number of times (f(gr)) that a grey value (gr) occurs in the image.

2. An apparatus as claimed in claim 1, wherein the image analyzing means includes time averaging means for deriving the brightness control signal (CS) from a maximum over the time averaged number of times that a grey value (gr) occurs in the image.

3. An apparatus as claimed in claim 1, wherein the image analyzing means includes running averaging means for deriving the brightness control signal (CS) from a maximum over the running averaged number of times (f(gr)) that (n) grey values (gr) occur in the image.

4. An apparatus as claimed in claim 3, wherein the number of times that grey values occur in the image (n) is lower than approximately 15.

5. An apparatus as claimed in claim 1, wherein the image analyzing means comprises threshold means for deriving the brightness control signal (CS) from a percentage (p) of one of said maxima.

6. An apparatus as claimed in claim 5, wherein the threshold means allows the percentage (p) to be adjustable in dependence on X-ray image quality parameters.

7. An apparatus as claimed in claim 6, wherein the percentage (p) is between 30% and 98% lower than said maximum.

8. An apparatus as claimed in claim 3 wherein the number of times that grey values occur in the image (n) and/or the percentage (p) are determined in dependence on X-ray image parameters including image amplifier format or type, maximum number ($gr_{max}$) of available grey values, amount of or estimation of direct radiation present in the image, X-ray intensity, film type, X-ray frequency spectrum, and/or object parameters including expected absorption coefficients of objects, for example lungs, brain etc.

9. An apparatus as claimed in claim 8, wherein the apparatus includes Fuzzy Logic means for determining Fuzzy Logic rule dependent values of the number of times that grey values occur in the image (n) and/or the percentage (p).

10. A method for deriving a brightness control value from information contained in an X-ray image, characterized in that the information includes data concerning a maximum in the frequency (f(gr)) of grey values (gr) occurring in the image.

11. The apparatus of claim 2 wherein the image analyzing means includes running averaging means for deriving the brightness control signal (CS) from a maximum over the running averaged number of times (f(gr)) that (n) grey values (gr) occur in the image.

12. The apparatus of claim 11 wherein the image analyzing means comprises threshold means for deriving the brightness control signal CS from a percentage (p) of one of said maxima.

13. The apparatus of claim 12 wherein the number of times that grey values occur in the image (n) and/or the percentage (p) are determined in dependence on X-ray image parameters including image amplifier format or type, maximum number ($gr_{max}$) of available grey values, amount of or estimation of direct radiation present in the image, X-ray intensity, film type, X-ray frequency spectrum, and/or object parameters including expected absorption coefficients of objects, for example lungs, brain etc.

14. The apparatus of claim 13 wherein the apparatus includes Fuzzy Logic means for determining Fuzzy Logic rule dependent values of the number of times that grey values occur in the image (n) and/or the percentage (p).

15. The apparatus of claim 7 wherein the percentage (p) is between 60% and 95% lower than said maximum.

16. The apparatus of claim 15 wherein the percentage (p) is about 90% lower than said maximum.

17. The apparatus of claim 4 wherein the number of times that grey values occur in the image (n) equals 5.

18. The apparatus of claim 1 wherein the object comprises human lung tissue.

* * * * *